United States Patent [19]

Kobayashi et al.

[11] Patent Number: 4,873,684
[45] Date of Patent: Oct. 10, 1989

[54] METHOD AND APPARATUS FOR MULTIPLEXING OF INPUT SIGNALS HAVING DIFFERING FREQUENCIES AND DEMULTIPLEXING SAME

[75] Inventors: Hirokazu Kobayashi, Gyoda; Yukihiko Miyamoto, Tama; Masaoki Takai, Tokyo; Syuichi Fujisawa, Tokyo; Hiroshi Miyazawa, Tokyo, all of Japan

[73] Assignees: Trio Kabushiki Kaisha; Nippon Hoso Kyokai, both of Japan

[21] Appl. No.: 246,923

[22] Filed: Sep. 19, 1988

Related U.S. Application Data

[63] Continuation of Ser. No. 868,036, May 29, 1986, abandoned.

[30] Foreign Application Priority Data

May 29, 1985 [JP] Japan ................................ 60-114357
May 29, 1985 [JP] Japan ................................ 60-114358
Sep. 18, 1985 [JP] Japan ................................ 60-204519

[51] Int. Cl.$^4$ ................................................ H04J 3/07
[52] U.S. Cl. ........................................ 370/102; 370/84
[58] Field of Search .................. 370/102, 84, 91, 112

[56] References Cited

U.S. PATENT DOCUMENTS

| | | | |
|---|---|---|---|
| 4,353,129 | 10/1982 | Nishiwaki | 375/112 |
| 4,542,500 | 9/1985 | Jean-Claude | 370/102 |
| 4,669,080 | 5/1987 | Aveneau et al. | 370/101 |

OTHER PUBLICATIONS

"Technology of PCM Communication" by N. Kaneko, pp. 18–122, Aug. 30, 1976.

*Primary Examiner*—Douglas W. Olms
*Attorney, Agent, or Firm*—Gerald J. Ferguson, Jr.

[57] ABSTRACT

A time division multiplex transmission system for time division multiplexing a plurality of information signals having different sampling frequencies and transmitting the time division multiplexed signal by one transmission path. The system includes the steps of: rearranging the plurality of information signals so as to have a format of the time division multiplexed signal by use of a reference sample signal which has a frequency obtained by multiplexing the maximum frequency or a frequency higher than the maximum frequency among the sampling frequencies of the plurality of information signals by the number of the plurality of information signals; and interposting a dummy signal into the portion where there is no available information signal.

7 Claims, 12 Drawing Sheets

ENCODER

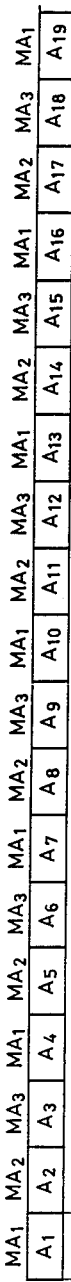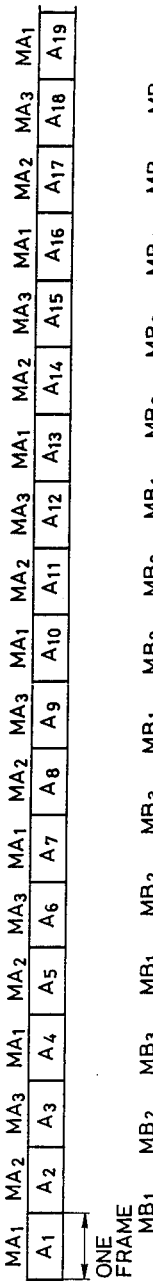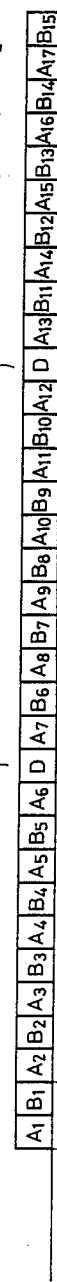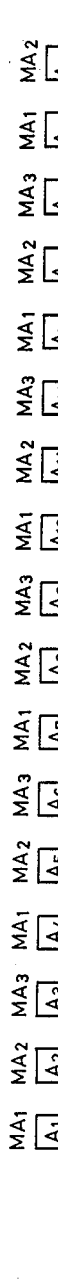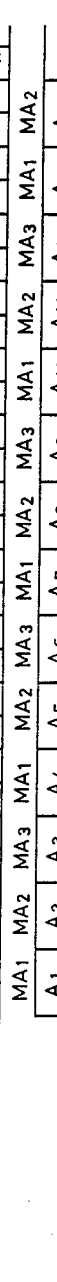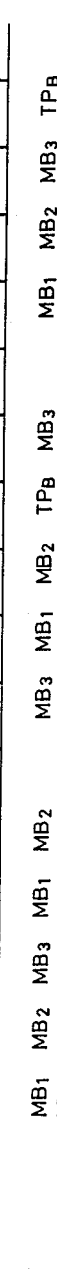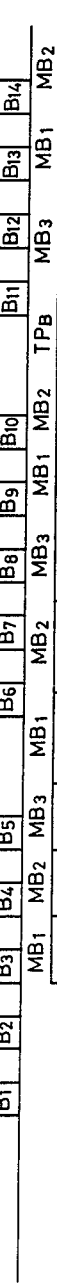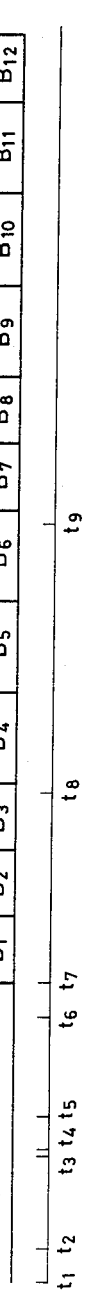
FIG. 4A
FIG. 4B
FIG. 4C
FIG. 4D
FIG. 4E
FIG. 4F
FIG. 4G

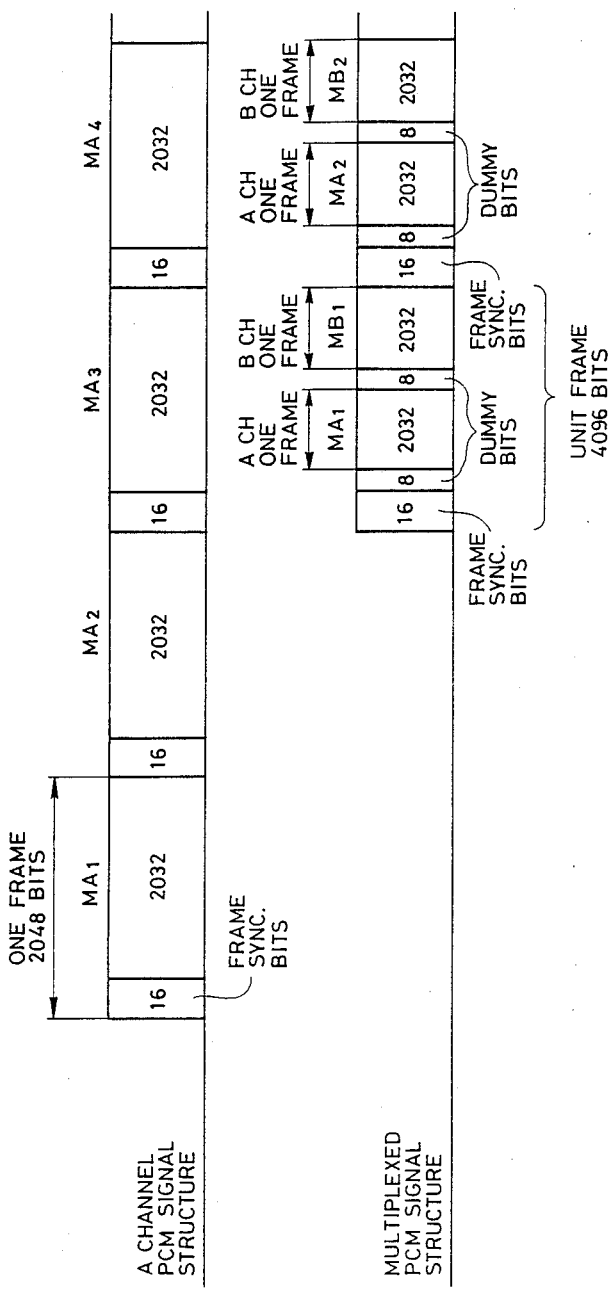

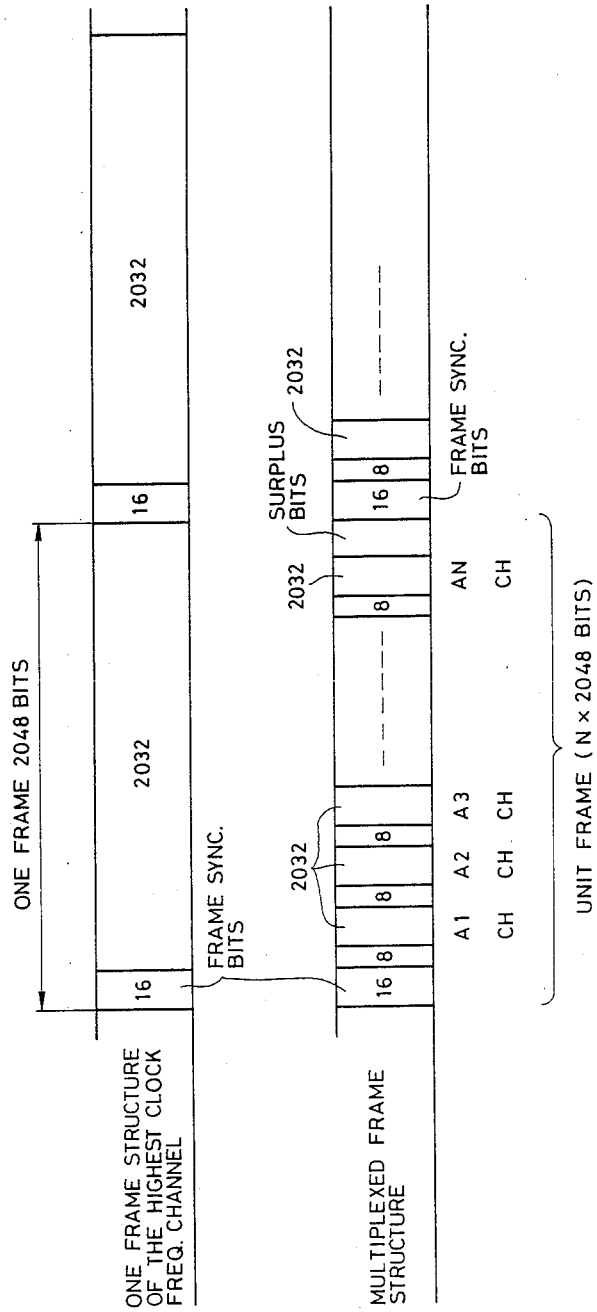

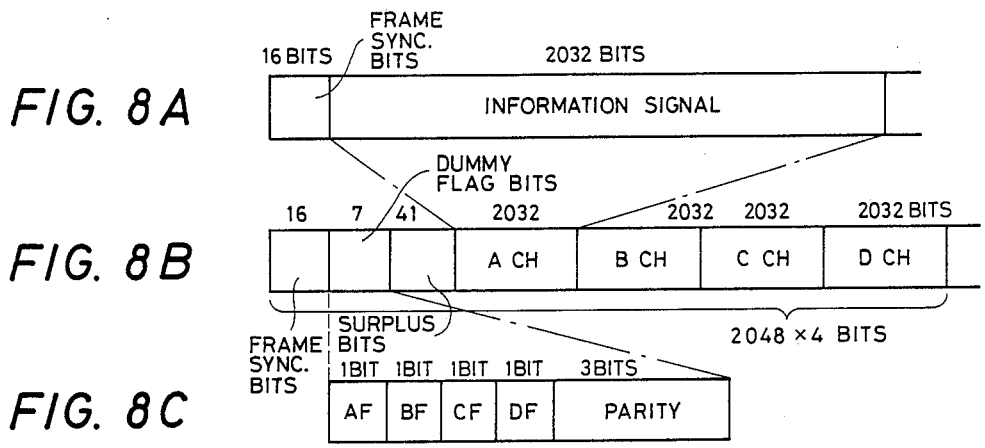
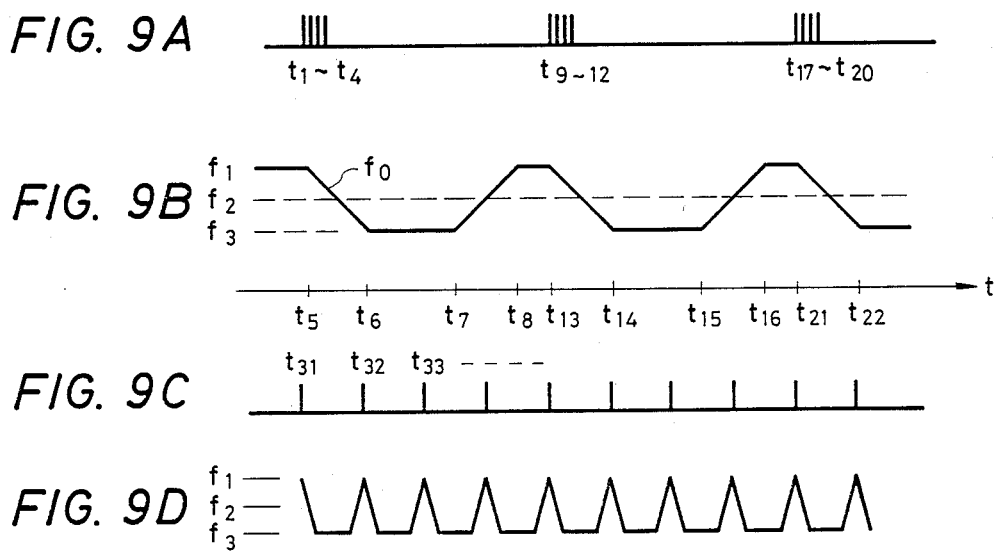

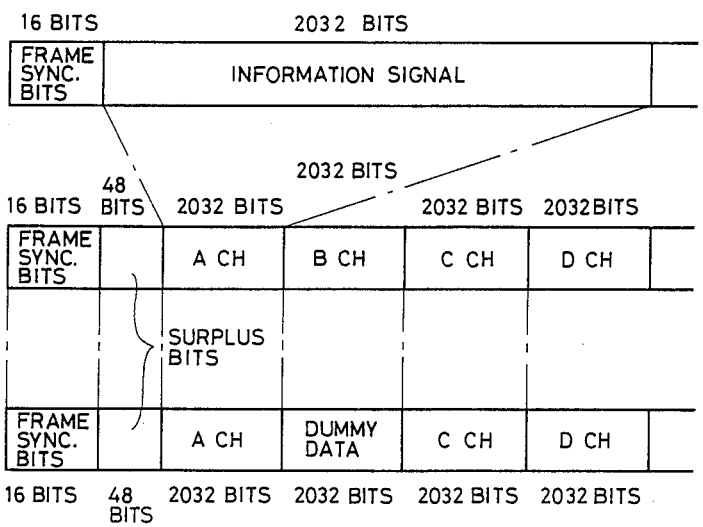
FIG. 12A
FIG. 12B
FIG. 12C
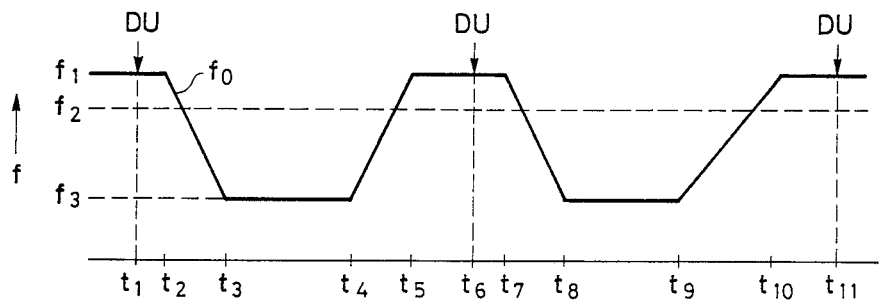
FIG. 14

METHOD AND APPARATUS FOR MULTIPLEXING OF INPUT SIGNALS HAVING DIFFERING FREQUENCIES AND DEMULTIPLEXING SAME

This application is a continuation of Ser. No. 868,036, filed 5/29/86 now abandoned.

FIELD OF THE INVENTION

The present invention relates to a time division multiplex (TDM) transmission system in which a plurality of information signals of analog or digital format having mutually different sampling frequencies or clock signal frequencies, for example, coded signals are time division multiplexed and transmitted by one transmission path.

The invention relates to a TDM transmission system which is suitable for use in the case where, for example, when the television radio wave is received from the broadcasting satellite and this received signal is retransmitted to the cable system, such as television community receiving equipment or the like, particularly, the coded audio signal is not decoded but the signals of a plurality of channels (in this specification, the term "channels" denotes the number of channels of the satellite broadcast corresponding to the number of video channels) are collected to the TDM signal in the format of the coded signal and retransmitted to the transmission path of one channel of the community receiving equipment (in the case of the current television broadcast, the transmission path per channel has the band width of 6 MHz).

BACKGROUND OF THE INVENTION

When considering the retransmission of the television radio wave from the broadcasting satellite to the cable system there has been known the method whereby both of the video and audio signals are once demodulated to the baseband signals and another carrier wave is remodulated by the baseband signals to form the television signal of the standard system and this television signal is retransmitted within the band width of 6 MHz, because the radio wave from the broadcasting satellite has the wide band width of 27 MHz.

According to this method, the video signal can be efficiently transmitted. However, the merit of the pulse code modulation (PCM) system to improve the receiving quality in the audio transmission of the satellite broadcast is lost. The independent data other than the audio signal cannot be transmitted as well.

There can be also considered another method whereby the pulse code modulated (PCM) audio signal is transmitted within the band width of 6 Mz of one channel of the television. For example, there is frequency division multiplex (FDM) transmission method. In this case, however, there are the drawbacks such that the transmission capacity of FDM system per channel has less capacity than that of TDM system and when a plurality of audio signals are simultaneously amplified by the wide band amplifier, the intermodulation distortion is likely to occur.

As a method of avoiding such problems, it can be considered to time division multiplex a plurality of audio signals. In this case, however, with respect to the PCM audio signals when the radio wave was received from the satellite, the clock signal frequencies in the pulse code modulation of the respective audio signals generally differ slightly due to the difference of the originating stations (transmitting stations of programs). Therefore, it is difficult to obtain the time division multiplexed (TDM) signal using the common clock signal.

SUMMARY OF THE INVENTION

It is therefore an object of the present invention to provide a TDM transmission system in which when a plurality of information signals such as the foregoing plurality of PCM audio signals or the like are transmitted as a TDM signal, various problems, which are caused due to the difference of the frequencies of the sample signals or clock signals for every information signal, can be eliminated, and a plurality of information signals are time division multiplexed by the common clock signal and can be transmitted by one transmission path.

To accomplish the above object, according to the invention, when a plurality of information signals having different sampling frequencies or clock signal frequencies are time division multiplexed and transmitted by one transmission path, those plurality of information signals are rearranged into the format of the TDM signal by use of the reference sample signal or reference clock signal having the frequency which is produced by multiplying the maximum frequency or a frequency higher than the maximum frequency among the sampling frequencies or clock signal frequencies of the plurality of information signals by the number of those plurality of information signals, and a dummy signal is interposed in the portion where the information signal lacks, thereby obtaining the continuous TDM signal.

According to a preferred embodiment of the invention, on the other hand, a plurality of information signals are stored on a frame unit bases into the memory means each consisting of three or more frame memories in real time by use of the sample signal or clock signal of each information signal. The respective signals stored are read out of the memory means in accordance with a predetermined sequence at the timing of the reference sample signal or reference clock signal in a manner such that the plurality of information signals become the TDM signal. Upon readout, in the case where the timing to read out the signals from the memory means comes before the end of storage into the memory means, the reading operation from the memory means is not performed but the dummy signal of one frame is substituted for the readout signal, thereby obtaining the continuous TDM signal.

The information signals which can be transmitted due to the transmission system of the invention are not limited to the PCM audio signals in the satellite broadcast but may be various kinds of arbitrary desired information signals such as digital signals which were pulse code modulated on a frame unit basis, sampled analog signals, or the like.

BRIEF DESCRIPTION OF THE DRAWINGS

FIGS. 4A to 4G are diagrams showing the writing and reading timings of the signal frames upon multiplexing and demultiplexing;

FIGS. 5A, 5B, 6A, and 6B are diagrams showing multiplex formats of two and N channels, respectively;

FIGS. 8A to 8C are diagrams showing a frame arrangement of the multiplexed signal which was multiplexed by the, multiplexer unit in FIG. 7;

FIGS. 9A to 9D are diagrams showing a situation of the frequency deviation of the read clock upon demultiplexing;

FIGS. 12A to 12C are diagrams showing a multiplexed frame arrangement in the third embodiment; and FIG. 14 is a diagram showing the deviation of a read clock frequency upon demultiplexing by the demultiplexer unit in FIG. 13.

DETAILED DESCRIPTION OF PREFERRED EMBODIMENTS

Prior to describing the present invention, the voice or audio signal of the satellite broadcast which can be applied to the invention will be schematically described.

Figure 1:
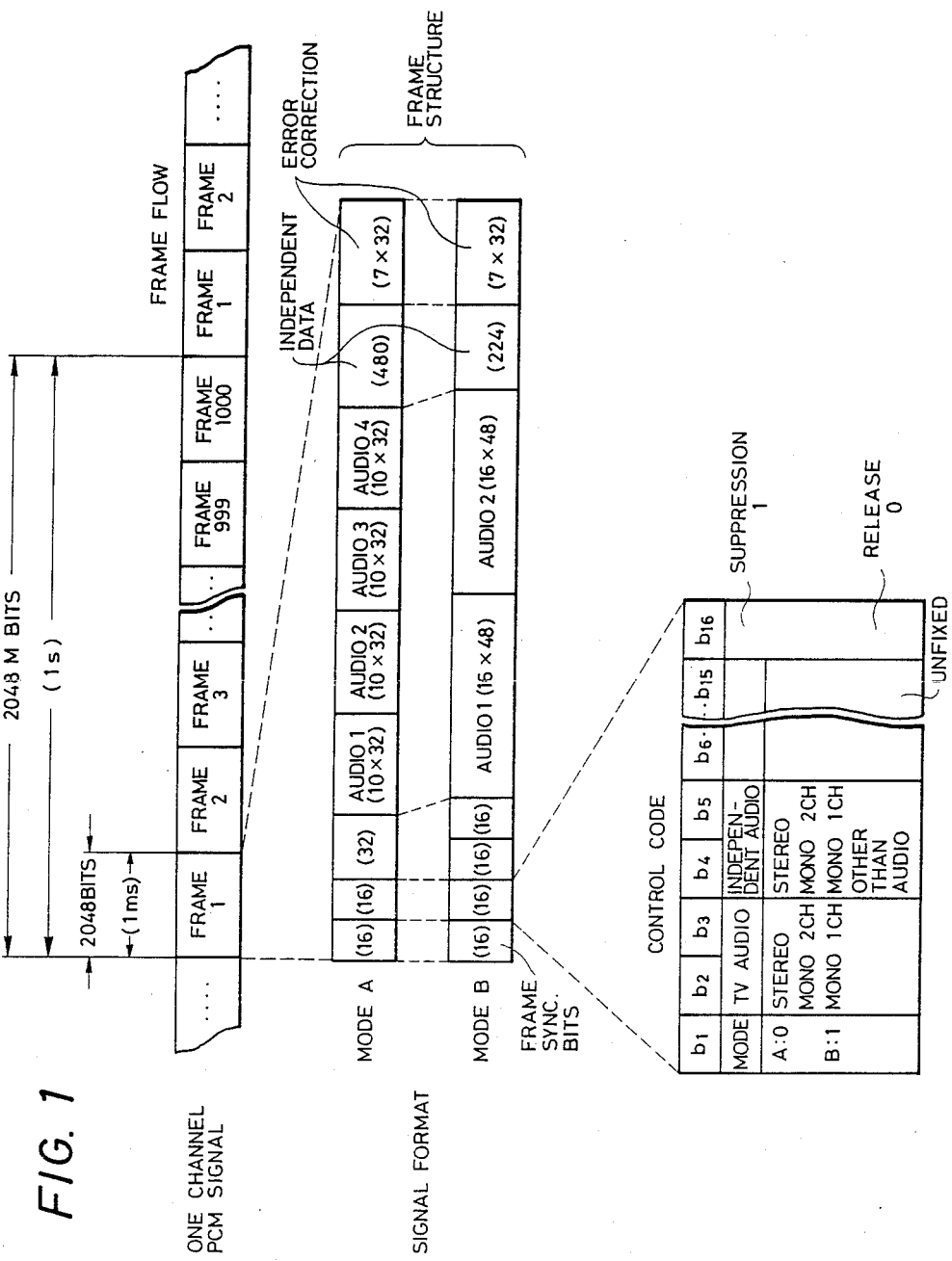
FIG. 1 is a diagram showing a whole arrangement of audio signal transmission formats in the satellite broadcast.

In the satellite broadcast, the high quality voice or audio sound can be reproduced by transmitting the voice or audio sound in the format of the digital signal. To realize it, however, the analog voice or audio signal is pulse code modulated to the PCM signal. Various kinds of control signals and error correction codes to correct transmission errors and the like are added to the PCM signal, thereby constituting a signal format as shown in FIG. 1 as one channel PCM signal. According to such a digital signal, it is possible to transmit the high quality voice or audio sound in which the dynamic range is wide and the S/N ratio is high, and which can endure the transmission noise and the like.

The transmission modes of the audio (including a voice) signal in the satellite broadcast includes mode A and mode B. There are four channels in the mode A and two channels among them are used for the television audio broadcast and the other two channels are used for the independent audio broadcast, respectively. In the mode B, the number of channels and the transmission capacity of the independent data are smaller than those in the mode A; however, the band width of the audio signal so wide to be 20 KHz (15 KHz in the mode A) and the broadcast having the better sound quality can be derived. The switching between the modes A and B, the switching between the stereo and the monaural, and the like are automatically performed by the control signals added to the PCM signal.

First Embodiment

The present invention will now be described hereinbelow with respect to an example of the case of a time division multiplex (TDM) transmission system with respect to the satellite broadcast PCM audio signal of two channels (A and B channels, respectively; however, the term "channels" in this case corresponds to the number of video channels in the satellite broadcast and doesn't mean the audio channels which the modes A and B have). According to the TDM transmission system of the invention, however, the PCM audio signals of an arbitrary desired number of channels within an allowable band limit range can be transmitted due to the similar system constitution. It is assumed hereinbelow that the clock frequency of the A channel is higher than that of the B channel.

Figure 2:
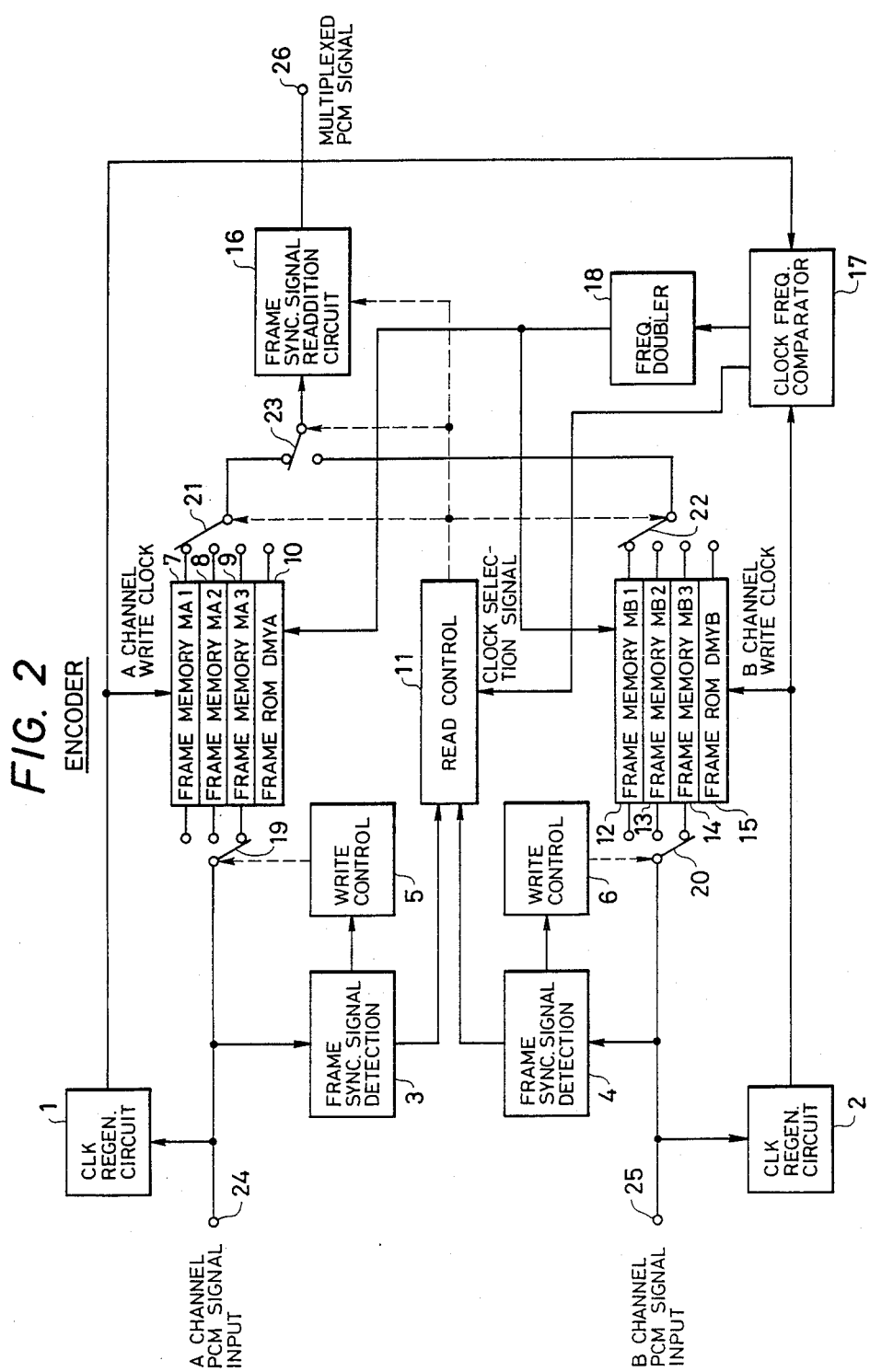
FIGS. 2 and 3 are block diagrams showing circuit arrangements of a multiplexer unit and a demultiplexer unit in a system of the first embodiment.
Figure 3:
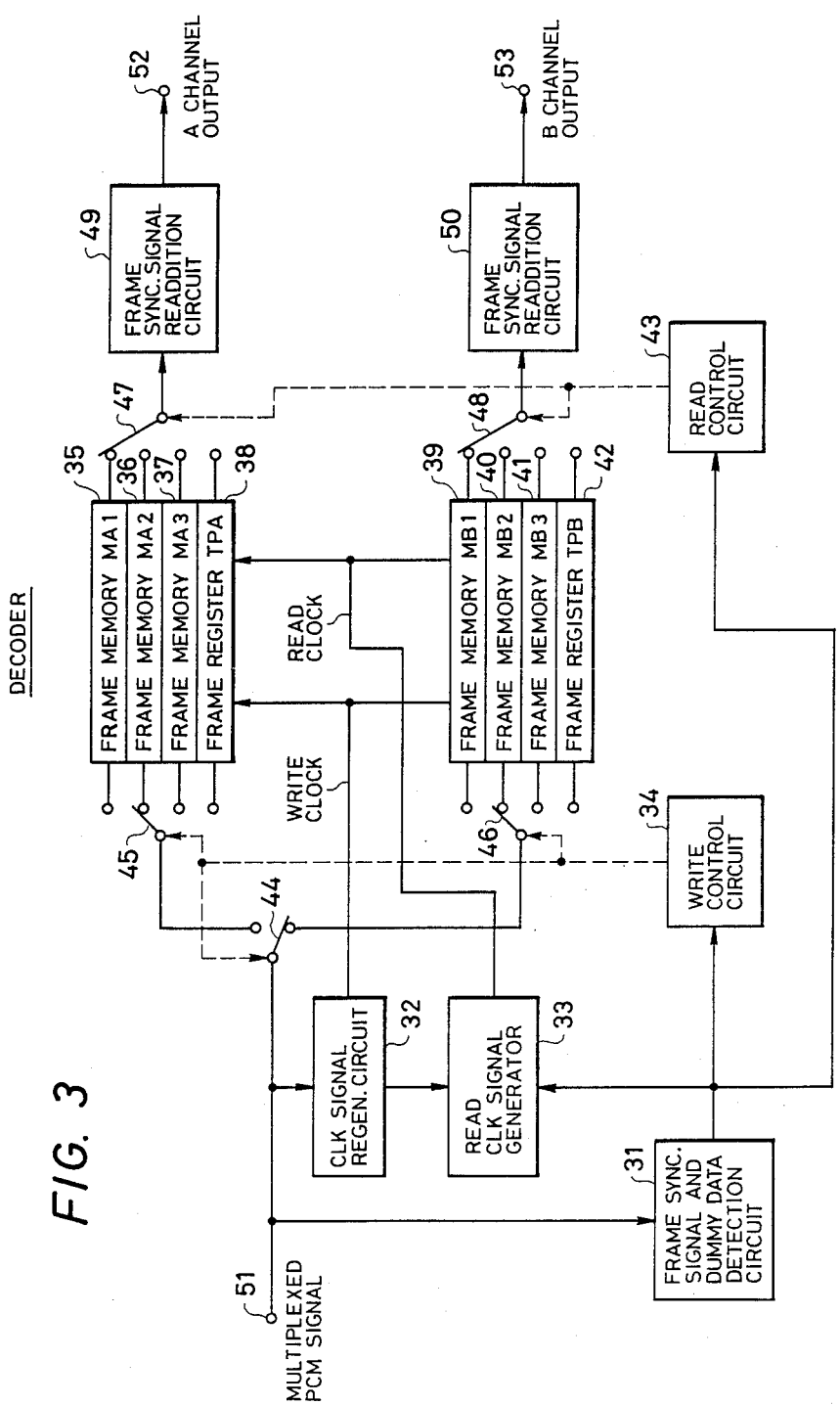

FIG. 2 shows a circuit arrangement of an encoder unit in the case where the audio subcarrier waves of the satellite broadcast radio waves of two channels are QPSK demodulated and the resulting bit stream of 2.048 Mbits/sec is multiplexed. FIG. 3 shows a circuit arrangement of a decoder unit. FIGS. 4A to 4G show timing charts of the signals in the encoder and decoder units.

In the encoder unit shown in FIG. 2, reference numerals 1 and 2 denote clock signal regeneration circuits of the A and B channels, respectively. These regeneration circuits receive pulse code modulated (PCM) signals of the respective channels which are supplied which from input terminals 24 and 25, namely, bit streams of 2.048 Mbits/sec and regenerate clock signals of the channels, respectively. These clock signals are used to write and store the input data into one-frame memories 7 to 9 and 12 to 14, respectively, which will be explained hereinafter.

The PCM signals of the A and B channels are further supplied to frame sync signal detection circuits 3 and 4 to detect the frame sync signals. These frame sync signals are supplied to frame memory write control circuits 5 and 6, respectively.

Change-over switches 19 and 20 are switched by write control signals produced by the write control circuits 5 and 6, respectively. The input PCM signals of the respective channels are sequentially written into three one-frame memories (i.e., $MA_1$ to $MA_3$) 7 to 9 and three one-frame memories (i.e., $MB_1$ to $MB_3$) 12 to 14 of the respective channels at the timings of the clock signals from the regeneration circuits 1 and 2. In this case, since there is the difference of the frequencies of the clock signals between the channels A and B, the write timings of the respective channels are as shown in FIGS. 4A and 4B. In these timing charts, $A_1$, $A_2$, $A_3$,—, and $B_1$, $B_2$, $B_3$,—denote frame data of the A and B channels, respectively. $MA_1$, $MA_2$, $MA_3$,—, and $MB_1$, $MB_2$, $MB_3$,—written over $A_1$, $A_2$, $A_3$,—, and $B_1$, $B_2$, $B_3$,—represent the frame memories into which those frame data are written, respectively.

In FIG. 2, numerals 10 and 15 denote one-frame fixed memories (ROM) (DMYA and DMYB) for dummy with respect to the A and B channels, respectively. Predetermined dummy data is preliminarily written into the memories 10 and 15.

The clock signals of the respective channels are supplied from the clock signal regeneration circuits 1 and 2 to clock frequency comparator 17, by which the clock signal having a higher frequency between these clock signals is selected and outputted. This clock signal is supplied to a frequency doubler 18 and its frequency is doubled to obtain a read clock signal At the same time, a clock signal selection information representing the clock signal of which channel was selected is also taken out of the comparator 17 and supplied to a read control circuit 11. The frame sync signals are supplied from the frame sync signal detection circuits 3 and 4 to the read control circuit 11. Either one of these frame sync signals is selected on the basis of the clock signal selection information from the comparator 17. In respect to this frame sync signal, read control signals to switch among the frame memories and between the channels are outputted.

The read control signals are supplied to change-over switches 21, 22, and 23. Either one of the channels of the frame memories 7 to 10 and 12 to 15 is alternately selected by the switch 23. In each channel, the frame memories 7 to 10 or 12 to 15 are switched by the switch 21 or 22. The storage data is read out of the selected frame memories at the timings of the read clock signal from the frequency doubler 18 as shown in FIG. 4C.

Namely, in the channel of the maximum clock frequency (the A channel in the example of FIGS. 4A and 4B), the readout operations are started in accordance with a predetermined arbitrary desired sequence of channels at the write start point ($t_3$) of the third one-frame memory 9 ($MA_3$). Thereafter, in the example shown in the diagram, the storage data is alternately read out in accordance with the sequence of the A channel and the B channel.

At such timings, the readout operation of the channel having the maximum clock frequency (the A channel in this example) is delayed from the writing operation by a constant time of only two frame periods. However, in the other channel of a lower clock frequency (the B channel in this example), the phases of the readout and writing operations are deviated, so that as shown at time $t_8$ FIG. 4C, there occurs the case where the writing and readout timings overlap in the same frame memory. Namely, when the frame data $B_6$ is being written into the memory $MB_3$ on the writing side of the channel B, the timing to read the frame data $B_6$ from the memory $MB_3$ comes on the reading side.

To avoid this situation, prior to reading the data from the memory, it is always confirmed that the data is not being written into this memory. If this memory is in the writing mode, dummy data D is read out of the frame fixed memory (one-frame ROM) 15. In other words, the dummy data D is transmitted at the period which is determined by the difference of the write clock frequencies of the respective channels. For example, in FIG. 4C, if one desires to read the frame data $B_6$ at time $t_8$, the writing operation is not finished yet; therefore, by inserting the dummy data D, the continuous clock signal is obtained.

The frame fixed memory (one-frame ROM) 10 on the A channel side is used when the B channel has a higher clock frequency than that of the A channel.

With this arrangement, the data is transmitted at one frame period of the channel having the maximum clock frequency (A channel) as the format such that a string of two frames (N frames in the case of the N channels) (hereinafter, referred to as a unit frame string) is repeated.

The sync bit of each frame is readded by a frame sync signal readdition circuit 16 in a format as shown in FIG. 5B at the timing of the read control signal from the read control circuit 11. A multiplexed PCM signal is outputted from an output terminal 26. Namely, as shown in FIG. 1, sixteen bits as the frame sync bits are added to the head of the unit frame string, and eight bits as the information to discriminate whether the data is the dummy data or not are added to the head of each frame.

FIG. 5B shows the case of two channels consisting of the channels A and B. However, in the case of N channels, the frames of the respective channels are multiplexed as shown in FIG. 6B. In such a case, surplus bits are further added to the end of the last frame of the unit frame string.

FIG. 3 shows a circuit arrangement of a decoder unit in the present invention. The bit stream of 4.096 Mbits/sec obtained in the encoder unit and shown in FIG. 4C is inputted to an input terminal 51. This bit stream is supplied to a frame sync signal and dummy data detection circuit 31 and a clock signal regeneration circuit 32.

The frame sync signal and dummy data are detected by the detection circuit 31. The write clock signal is regenerated from the regeneration circuit 32.

The write clock signal and frame sync signal are supplied to a read clock signal generator 33 to generate a read clock signal. The frame sync signal is supplied from the detection circuit 31 to a write control circuit 34. The operations of a channel change-over switch 44 and frame change-over switches 45 and 46 are controlled on the basis of write control signals produced by write control circuit 34. Similarly, the frame sync signal is supplied from the detection circuit 31 to read control circuit 43. The operations of frame change-over switches 47 and 48 are controlled on the basis of the read control signals produced by the read control circuit 43.

The bit stream inputted from the terminal 51 is distributed for every channel due to the switching of the switch 44 on the basis of the (frame sync) information added to the head of each frame. These bit streams are sequentially supplied to three frame memories ($MA_1$ to $MA_3$) 35 to 37 and three frame memories ($MB_1$ to $MB_3$) 39 to 41 of the respective channels at timings as shown in FIGS. 4D and 4F due to the switching of the switches 45 and 46 and written into these memories at the timing of the write clock signal regenerated by the regeneration circuit 32.

The data written into the frame memories 35 to 37 and 39 to 41 is read out at the clock rate of $\frac{1}{2}$ of that upon writing with the delay time of two frame periods by the read clock signal from the generator 33 due to the switching of the switches 47 and 48 under control of the read control circuit 43 as shown in FIGS. 4E and 4G.

When the dummy data D is detected in the input bit stream as shown in FIG. 4C, the writing operation of the dummy data D is stopped at that time ($t_8$) (FIG. 4F) and at the same time, the frequency of the read clock signal of that channel (B channel) is decreased, thereby extending the time duration of the data from the frame data $B_4$ and reading out the data as shown in FIG. 4G. In this case, the difference of the frequencies between this case and the ordinary case is set to a value within an allowable range as the input of the PCM audio signal decoder of the satellite broadcast receiver to perform the individual reception.

The reading phase is delayed from the writing phase per one frame in the B channel from the time point when the frame data was extended. Therefore, if the writing and readout operations are continued in this delayed state, there occurs the case where the writing and readout timings overlap in the same frame memory ($MB_3$ in this case) as shown at time $t_9$ in FIGS. 4F and 4G. Namely, since the data is being read out of the frame memory $MB_3$, the frame data $B_9$ is not written into the frame memory $MB_3$ at this time but written into a one-frame temporary register (TPB) 42 shown in FIG. 3. The frequency of the read clock signal when the data is read out is also returned to the ordinary clock frequency from the next frame readout time point of this time ($t_9$). To read out the data $B_9$ from the TPB 42, the frame change-over switch 48 is switched under control of the read control circuit 43 so as to read out the data from the temporary register (TPB) 42 at the readout timing of the frame memory $MB_3$.

A one-frame temporary register (TPA) 38 is arranged in parallel with the frame memories 35 to 37 of the A channel so that the processes similar to the above can be carried out in the A channel as well. The TPA 38 is made operative when the clock frequency of the B channel is higher than that of the A channel in the encoder input on the transmission side.

In place of the dummy data bits (refer to FIGS. 5A and 5B), the inherent frame sync signal is readded to each frame data read out sequentially as described above by frame sync signal readdition circuits 49 and 50, thereby forming the signals which can be demodulated by the existing satellite broadcast PCM audio signal decoder. Then, the outputs of the A and B channels are taken out of output terminals 52 and 53.

In the case of the N-channel multiplex transmission, the clock rate upon transmission is increased by N times. However, it can be fundamentally realized by the arrangement similar to that upon transmission of two channels.

Further, in the above embodiment and in the case of the N-channel multiplex transmission as well, the signal having the frequency of which the maximum frequency among the clock frequencies of the respective channels was multiplied by two or N times was used as the reference clock signal for the multiplex transmission (clock signal of the transmitting signal). However, the frequency of the reference clock signal may be set to a frequency higher than that frequency. In this case, if the information signals of the respective channels are rearranged to produce the time division multiplex (TDM) signal, the blank time occurs per frame. Therefore, another information signal is multiplexed to this portion and can be transmitted.

Further, the signal to be multiplexed in this invention is not limited to the digital signal such as the foregoing PCM signal and the like but it will be easily understood that the invention can be also applied to the case of the sampled analog signal (PAM signal) due to substantially the same arrangement as above (excluding that the analog memories are substituted for the digital memories).

As will be obvious from the above description, according to the TDM transmission system of the invention, the information signals are multiplexed and transmitted as the inherent formats by use of the clock signal which is common to a plurality of information signals. Therefore, the deterioration in sound quality as in the system such that the information signals are demodulated to the baseband signals and then remodulated does not occur and no problem occurs in the transmission of the independent data as well. Namely, in the PCM audio bit streams of N channels which are constituted by the information frames to which the frame sync bits (sixteen bits) were added, even in the case where the clock frequencies of the respective channels slightly differ as well, they can be multiplex transmitted without a deterioration of the sound quality and a lack of independent data.

Further, there is no need to use a complicated circuit arrangement such as a digital-to-digital converter. An output signal of the decoder on the reception side is the original bit stream of 2.048 Mbits/sec. Therefore, there is also the advantage such that the existing integrated circuit (IC) to demodulate the satellite broadcast PCM audio signal can be used, or the like.

Second Embodiment

The second embodiment relates to a time division multiplex (TDM) transmission system in which when the original information signal is demultiplexed from the time division multiplexed signal, a change in frequency of the read clock signal can be reduced and the deterioration of the demodulated signal can be prevented.

The second embodiment will be summarized as follows. A frame buffer memory is provided for a multiplexer unit in the foregoing TDM transmission system. The timing to read out the data form the frame buffer memory is close to the data writing timing. When the delay amount from the data writing operation until the data readout operation reaches predetermined frames, the data readout operation is continuously stopped by Y frames (Y is an integer larger than 1). At the same time, the dummy signal of one frame is continuously sent Y times.

Thus, when the original information signals are demultiplexed on the reception side from the TDM signal, the appearance of the dummy signal is detected and the read clock signal frequency is changed, thereby making it possible to reduce the time-dependent change in the read clock signal frequency to obtain the continuous original information signal. Thus, the deterioration to the quality of the demodulated voice or audio sound is reduced.

Figure 7:
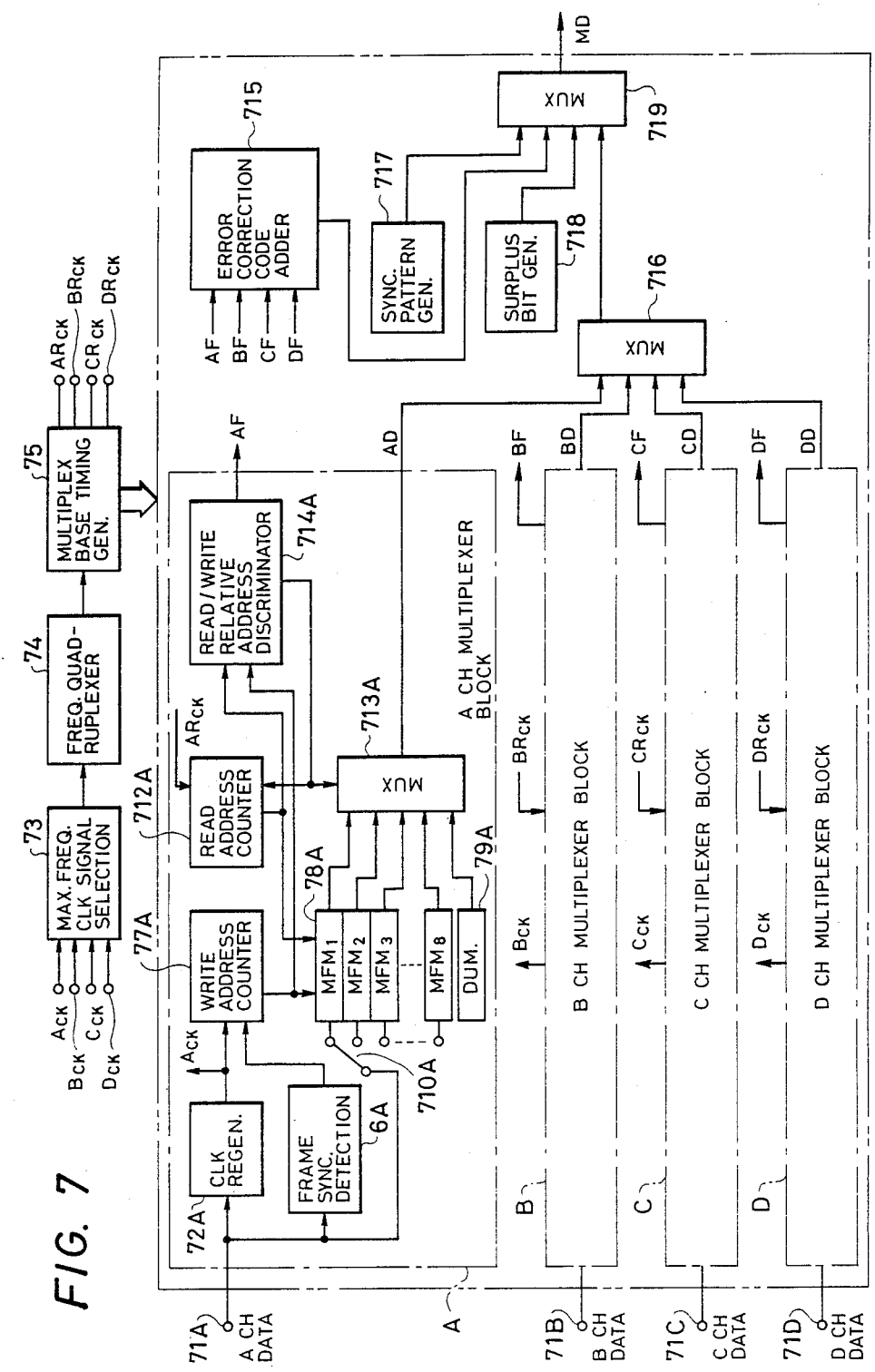
FIGS. 7 and 10 are block diagrams showing circuit arrangements of a multiplexer unit and a demultiplexer unit in a system of the second embodiment.

FIG. 7 is a block diagram showing an arrangement of the second embodiment and shows an example of the case of multiplying the information signals of four channels of A to D.

A to D denote multiplexer blocks having the same constitution. Only the portion common to the A channel multiplexer clock A is shown in detail. The block A will be explained and the other channel multiplexer blocks B, C and D will be described as necessary.

The bit stream (hereinafter, also referred to as data) having the constitution of 2048 bits/frame (including sixteen frame sync bits) of the PCM signal of the A channel supplied to an input terminal 71A as shown in FIG. 1 is supplied to a clock regeneration circuit 72A and a clock signal $A_{CK}$ of the A channel is regenerated. Similarly, clock signals $B_{CK}$, $C_{CK}$, and $D_{CK}$ of the B, C, and D channels are regenerated from the data of the B, C, and D channels supplied to input terminals 71B, 71C, and 71D, respectively. The regenerated clock signals $A_{CK}$, $B_{CK}$, $C_{CK}$, and $D_{CK}$ are supplied to a maximum frequency clock signal selection circuit 73 and the clock signal of the maximum frequency is selected. The clock signal selected by the selection circuit 73 is supplied to a frequency quadruplexer 74 and quadruplexed and thereafter it is supplied to a multiplex base timing generator 75. The generator 75 generates read clock signals $AR_{CK}$, $BR_{CK}$, $CR_{CK}$ and $DR_{CK}$ having the frequencies which are four times as large as the maximum clock frequency in each input channel. The generator 75 also generates various kinds of timing signals necessary to multiplex (encode), for example, a switching signal of a change-over switch 710A to switch frame memories $MFM_1$ to $MFM_8$ of a memory block 78A, which will be explained hereinafter, a control signal of a write address counter 77A, a control signal of a read address counter 712A, selection signals of multiplexers 713A, 716, and 719, and the like.

The A channel data supplied to the input terminal 71A is supplied to a frame sync detection circuit 76A to detect the frame synchronization. The clock signal regenerated by the clock regeneration circuit 72A is counted by the write address counter 77A. The write address in the memory block 78A is designated by the count value of the address counter 77A. The A channel information data is supplied through the switch 710A to the memory block 78A forming the frame buffer memory. In this embodiment, the memory block 78A is constituted by eight frame memories MFM$_1$ to MFM$_8$. Further, each frame memory is composed of 2032 bits. When the 16-bit frame sync signal exists, the counting operation of the address counter 77A is stopped and the switch 710A is connected to the non-connection contact. The switch 710A is sequentially switched for every 2032 bits of the information data in the order of the frame memories, MFM$_1$,—, MFM$_8$, MFM$_1$,—. Thus, the information data from which the frame sync bits were removed is stored into the frame memories MFM$_1$,—, MFM$_8$,—in the memory block 78A for every frame.

On the other hand, in the read address counter 712A, the read clock signal AR$_{CK}$ generated from the generator 75 is counted. The read address in the memory block 78A is designated by the count value of the address counter 712A.

The read clock signals AR$_{CK}$, BR$_{CK}$, CR$_{CK}$, and DR$_{CK}$ are generated in accordance with this order from the generator 75 in order to read out the data of 2032 bits in accordance with the sequence of the A, B, C, and D channels. To interpose the management information bits, and prior to outputting the read clock signal AR$_{CK}$, the readout operation from the memory block 78A is inhibited for the period of time of predetermined bits and at the same time, the counting operation of the read address counter 712A is stopped. In this embodiment, the number of predetermined bits is set to 64.

Therefore, the information data is read out of the memory block 78A (78B, 78C, 78D) in a manner such that after an expiration of the period of time corresponding to 64 bits, the data is read out of a frame memory MFM$_h$ in the memory block 78A, a frame memory MFM$_k$ in the memory block 78B,—, and a frame memory MFM$_p$ in the memory block 78D, and after an expiration of the time period of 64 bits, the data is read out of a frame memory MFM$_{(h+1)}$ in the memory block 78A,—, a frame memory MFM$_{(p+1)}$ in the memory block 78D,—. On the other hand, the read clock signal has the frequency which is at least four times as large as that of the write clock signal. The data is read out of the memory block 78A (78B, 78C, 78D) of the same channel for every four channels. Therefore, upon initialization, an offset is given between the write frame memory and the read frame memory. However, the readout operation is performed at an early period by the time corresponding to only the difference between the frequency of ¼ of the read clock signal frequency and the write clock signal frequency, so that the read address is advanced early due to this difference.

On the other hand, the count values of the write address counter 77A and read address counter 712A are compared by a read/write relative address discriminator 714A. For example, when the data is read out of the frame memory MFM$_1$ in the memory block 78A, if there occurs the case where the writing operation into the frame memory MFM$_1$ is not completed yet, namely, the case where the data lacks, the discriminator 714A stops the counting operation of the read address counter 712A for the period of time of a plurality of (e.g., four) frames and also stops the readout operation of the data of a plurality of frames. During this period of time, the dummy data is preliminarily stored by the multiplexer 713A and at the same time, the dummy data from a ROM 79A which has always been read out by the read clock signal AR$_{CK}$ is selected and outputted. Thus, the multiplexed data is continuous since the dummy data is interposed between the information data of a frame unit. Also, the multiplexed data becomes the state in which the dummy data was successively interposed a plurality of times (four times in this example) at the information data position of the A channel. The period to interpose the dummy data is determined on the basis of the difference between the frequency of ¼ of the read clock frequency and the write clock frequency as mentioned above. The data AD (BD, CD, DD) outputted from the multiplexer 713A (713B, 713C, 713D) as explained above is selectively outputted by the multiplexer 716.

On the other hand, discriminator 714A outputs one dummy flag bit AF such as to make it possible to discriminate on the reception side between the case where the information data lacks and the dummy data is interposed as mentioned above and the case where there is no lack of information data and the data is read out of the frame memories MFM$_1$ to MFM$_8$ as mentioned above. In the cases of the multiplexer blocks B, C, and D as well, dummy flag bits BF, CF, and DF each consisting of one bit are outputted in a similar manner. The dummy flag bits AF, BF, CF, and DF are supplied to an error correction code after 715 to add error correction codes to them. In this embodiment, the redundancy bits of three bits produced due to the BCH (7, 4) code are added and outputted by the adder 715.

Therefore, sixteen bits forming a sync pattern from a sync pattern generator 717, seven bits from the adder 715, surplus bits, i.e., forty-one bits from a surplus bit generator 718, and information data (2032 bits×4) of the A, B, C, and D channels from the multiplexer 716 are selected as a block by the multiplexer 719 in accordance with this order and outputted as the multiplexed data MD of one frame. Therefore, an arrangement of one frame in this case is as shown in FIG. 8B.

FIG. 8A shows an arrangement of one frame before the multiplex. FIG. 8C shows a bit arrangement of the dummy flag bits in FIG. 8B.

A demultiplexer to demultiplex the multiplexed signal into the original signals will now be described.

Figure 10:
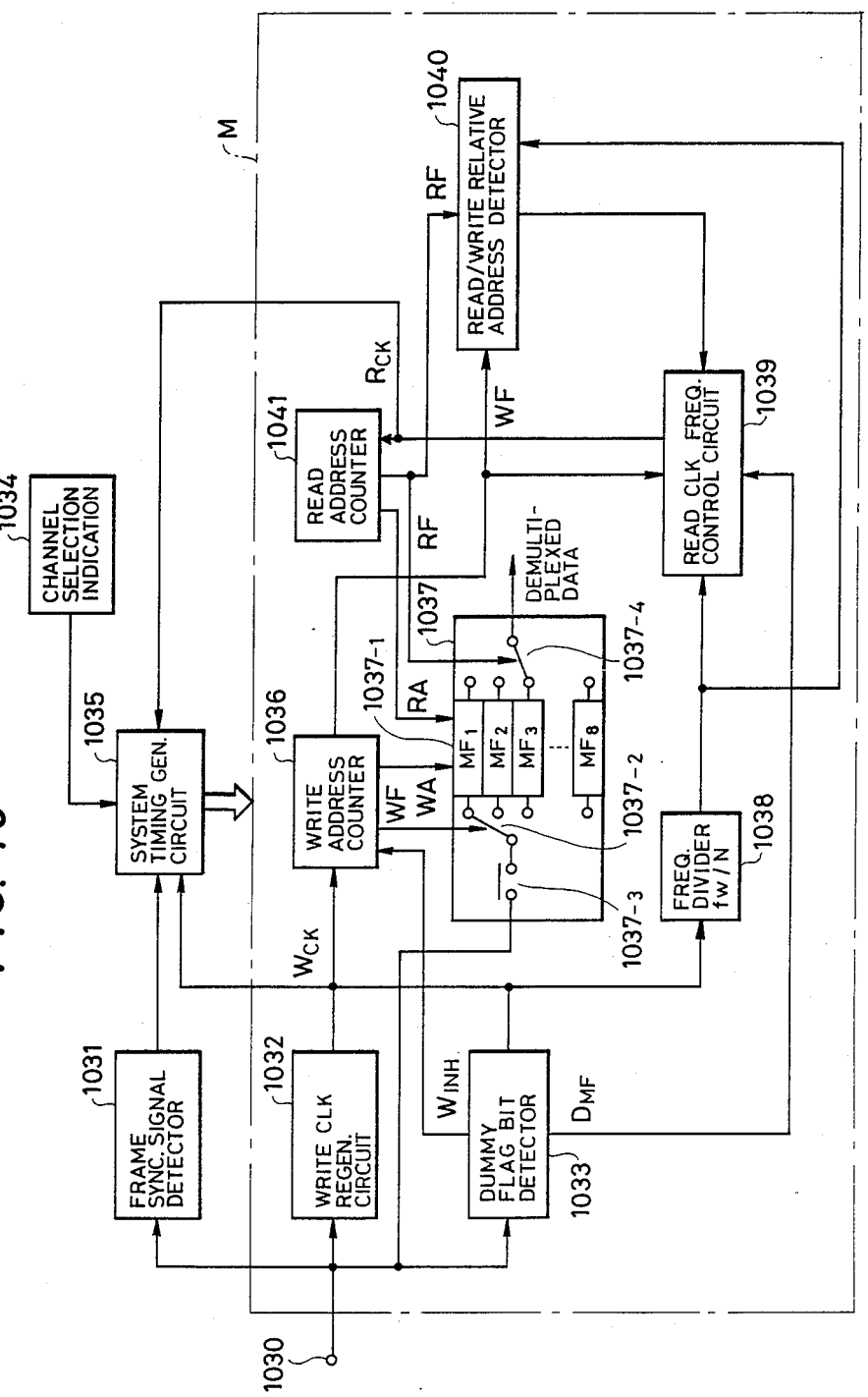

FIG. 10 is a block diagram showing an example of a multiplexed signal demultiplexer unit for demultiplexing the original information signals from the time division multiplex (TDM) signal on the reception side.

The TDM signal shown in FIG. 7B is inputted to an input terminal 1030.

The bit stream is supplied to a frame sync signal detection circuit 1031 and a write clock signal regeneration circuit 1032. The frame sync signal is detected by the detection circuit 1031. A write clock signal W$_{CK}$ is regenerated from the regeneration circuit 1032. The bit stream and write clock signal W$_{CK}$ are also supplied to a dummy flag bit detection circuit 1033. The error detection and error correction-decode are performed with respect to the dummy flag bits. The decoded dummy flag bits are detected. A check is made to see if the information signal of the subsequent channel is the dummy data or not. If it is the dummy data, an inhibition instruction signal W$_{INH}$ is outputted to inhibit the counting operation by a write address counter 1036, which will be explained hereinafter.

The frame sync signal, write clock signal W$_{CK}$, an output of a channel selection indication switch 1034 to select the reception channel, and a read clock signal R$_{CK}$, which will be explained hereinafter, are supplied to a system timing generation circuit 1035. The generation circuit 1035 generates a timing signal necessary for the decoding operation by a main unit M of the TDM signal demultiplexing apparatus (hereinafter, also referred to as the decoder).

On the other hand, this embodiment is provided with a memory block 1037 comprising: a frame buffer memory 1037-1 consisting of eight frame memories (MF$_1$ to MF$_8$); frame memory change-over switches 1037-2 and 1037-4; and an input selection switch 1037-3 for supplying the information signal of the channel selected by the switch 1034 the bit stream to the switch 1037-2. The capacity of one-frame memory is set to a value enough to store the data transmission amount of one frame (in this example, 2032 bits).

The write clock signal W$_{CK}$ is supplied to the write address counter 1036 and a write address signal W$_A$ and a frame memory number signal W$_F$ corresponding to the write frame memory number are produced. The write address signal W$_A$ is supplied to the memory block 1037 and designates the write address. The frame member signal W$_F$ controls the switch 1037-2 and selects the write frame. On the other hand, the inhibition instruction signal W$_{INH}$ is also supplied to the write address counter 1036 to stop the advance of the address signal, thereby inhibiting the writing operation of the dummy data into the memory block 1037 as well.

The write clock signal W$_{CK}$ is also supplied to a frequency divider 1038 and frequency divided so as to become the frequency ($=f_1$) of 1/N ($=4$) of the transmission clock signal frequency after the time division multiplex. An output signal of the frequency divider 1038 is supplied to a read clock frequency control circuit 1039 to produce the read clock signal R$_{CK}$ of a frequency f$_0$. The control circuit 1039 receives a dummy flag detection output DMF when the dummy flag is detected by the dummy flag bit detection circuit 1033 and the output of the frequency divider 1038. From the writing operation into the special frame memory, e.g., the first frame memory MF$_1$ in the memory block 1037 after detection of the dummy flag, the control circuit 1039 gradually reduces the read clock signal frequency f$_0$ from f$_1$ to f$_3$. In addition, when the control circuit 1039 detects the difference of, e.g., six frames between the write address into the first frame memory MF$_1$ and the read address therefrom, the control circuit 1039 increases the frequency from f$_3$ to f$_1$ in response to an output of a read/write relative address detection circuit 1040.

The read clock signal R$_{CK}$ is supplied to a read address counter 1041 to produce a read address signal R$_A$ and a frame memory number signal R$_F$ corresponding to the read frame memory number. The read address signal R$_A$ is supplied to the memory block 1037 and designates the read address. The frame memory number signal R$_F$ controls the switch 1037-4 to select the read frame memory.

The transmission clock signal after the multiplex, namely, the write clock signal W$_{CK}$ and the frame sync signal are detected from the bit stream supplied to the input terminal 1030 and shown in FIG. 8B, thereby performing the frame synchronization.

When the power supply is turned on and when the selected channel is switched by the channel selection indication switch 1034, the change-over switches 1037-2 and 1037-4 are switched in response to the timing signals from the system timing generation circuit 1035 in a manner such that the delay amount of five frames is provided between the write frame memory an the read frame memory, namely, the offset of six frames is provided so that five frames exist between the write frame memory and the read frame memory. It is now assumed that the B channel is selected by the switch 1034 and the sampling frequency or clock signal frequency of the B channel is lower than that of the other channel before the multiplex on the transmission side.

After the frame synchronization was derived, the information signal of the B channel in the bit stream is taken out through the input selection switch 1037-3 by the timing signal from the generation circuit 1035. The information signals of one channel are sequentially supplied to the one-frame memories due to the switching of the switch 1037-2 by the frame memory number signal W$_F$ and sequentially written into the frame memories MF$_1$, MF$_2$,—, MF$_8$, MF$_1$,—synchronously with the write clock signal W$_{CK}$.

On the other hand, the write clock signal W$_{CK}$ is divided into 1/N by the frequency divider 1038, so that the read clock signal R$_{CK}$ of the frequency f$_1$ ($=f_w/4$) is outputted from the control circuit 1039. The frame change-over switch 1037-4 is switched due to the change-over by the frame memory number signal R$_F$ with the delay time of six frames for the write frame memory and synchronously with the read clock signal R$_{CK}$. Thus, the information signals of the B channel stored are sequentially read out of the frame memories MF$_1$,—, MF$_8$,—by the read clock signal R$_{CK}$ of the frequency of ¼ of that upon writing.

The dummy data DU is interposed in, for example, the 100th, 101st, 102nd, and 103rd frames of the B channel. Therefore, the dummy flag bits indicating that the next information signal is the dummy data are set in the dummy data just before the B channel in each of the 100th, 101st, 102nd, and 103rd frames. These dummy flag bits are detected by the dummy flag bit detection circuit 1033 and the inhibition instruction signal W$_{INH}$ is outputted.

FIG. 9A is a timing chart diagrammatically showing the generation of the dummy flags. In FIG. 9A, the times when the dummy flag bits were detected are indicated at t$_1$ to t$_4$, t$_9$ to t$_{12}$, and t$_{17}$ to t$_{20}$ and the period of t$_1$ to t$_2$ corresponds to one frame.

FIG. 9B shows a change in frequency of the read clock signal R$_{CK}$. When the inhibition instruction signal W$_{INH}$ is outputted, the writing of the information signals (dummy data in this case) of the B channel of four frames is stopped. The data is read out synchronously with the read clock signal R$_{CK}$ of the same frequency f$_1$. Thus, the readout timing from the read frame memory is close to the writing timing into the write frame memory. When the writing operation is restarted, the readout timing from the read frame memory is closest to the writing timing into the write frame memory. In this state as well, the data is sequentially written into the frame memories, MF$_1$, —, MF$_8$,—. During this period, if the data is first written into the first frame memory MF$_1$ (at times t$_5$, t$_{13}$, t$_{21}$) after the dummy flag bits were detected, these writing operations are detected by the read clock frequency control circuit 1039. The frequency f$_0$ of the read clock signal R$_{CK}$ is gradually reduced from f$_1$ to f$_3$ from times t$_5$, t$_{13}$, and t$_{21}$ and maintained at the frequency f$_3$ for a predetermined period. In FIG. 9B, the times when the frequency of the read clock signal R$_{CK}$ coincides with the frequency f$_3$ are represented by t$_6$, t$_{14}$, and t$_{22}$.

On the other hand, for the period of time when the frequency f$_0$ of the read clock signal R$_{CK}$ is reduced from f$_1$ to f$_3$ and for the period of time when the frequency is held at $f_3$, the output frequency ($f_w/N$) of the frequency divider 1038 is counted for the interval after the write frame memory became the first frame memory $MF_1$ until the read frame memory becomes the first frame memory $MF_1$. A check is made to see if the count value becomes the value corresponding to six memory frames or not by the read/write relative address detection circuit 1040. From the time when the count value became the value corresponding to six memory frames (times $t_7$ and $t_{15}$) due to the discrimination, the frequency of the read clock signal $R_{CK}$ is gradually returned from $f_3$ to $f_1$. From the time when the frequency $f_0$ of the signal $R_{CK}$ coincides with $f_1$ (times $t_8$ and $t_{16}$) in this state, the frequency $f_0$ is held at $f_1$ and the apparatus waits until the next dummy flag bits are detected.

The reason why the read clock signal frequency $f_0$ is gradually decreased or increased is to avoid the sudden change in frequency and to reduce the deterioration in sound quality due to, particularly, the variation in sampling frequency and the like when the PCM audio signal or the like in the satellite broadcast is demodulated into the analog audio signal. Therefore, it is desirable to fairly gradually change the read clock signal frequency little by little for a long period of time as possible within the dummy data transmission period. For this purpose, it is sufficient to set the lower limit frequency $f_3$ of the read clock signal $R_{CK}$ to a small value.

In FIG. 9B, the frequency $f_2$ denotes the original transmission clock signal frequency before the time division multiplex.

When it is now assumed that the dummy data was interposed for the period of one frame on the multiplex side (transmission side), as mentioned above, the dummy data appears for the period of ¼ as shown in FIG. 9C when the original information signals are demultiplexed from the TDM signal on the reception side as compared with the case where the dummy data was interposed for the period of four frames. In the case of demultiplexing the original information signals in this state due to the system shown in FIG. 10, the read clock signal frequency is changed as shown in FIG. 9D. Thus, the time-dependent change of the read clock signal frequency $f_0$ increases. When the PCM audio signal or the like in the satellite broadcast is demodulated into the analog signal, the deterioration in sound quality due to, particularly, the variation in sampling frequency and the like increases.

As described above, according to this embodiment, by continuously sending the dummy signal without interposing any information signal, the period when the dummy signal appears can be prolonged. Thus, the time-dependent change in the read clock frequency in the demultiplexer (decoder) for demultiplexing the original information signals from the TDM signal on the reception side can be reduced. The deterioration in the demodulated sound quality (variation in sampling frequency) is decreased. Further, there is also an effect such that the operations to reduce the time-dependent change or variation range in the read clock frequency in the decoder, and the like can be simplified.

In the frame structure after multiplex in the first embodiment, as shown in FIG. 5B, the dummy flag consists of eight bits for every channel frame and the bits indicating whether the signal of the channel which is transmitted next is the dummy data or not are included. However, according to such a frame structure, there are problems such that when errors occur in the dummy flag bits in the transmission line (including the transceiver apparatus), the error correction cannot be performed upon decoding to demultiplex the original information signals from the TDM signal on the reception side, and a code rate is low (i.e., the number of surplus bits is small). On the other hand, according to the frame structure after multiplex in the second embodiment, as shown in FIG. 8B, the dummy flag bits corresponding to each of a plurality of channels are combined as one block. With this structure, one bit is sufficient for each of the dummy flag bits AF,—, DF. Therefore, the error correction code is added. Thus, when errors occur in the dummy flag bits in the transmission line (including the transceiver apparatus), the error detection and error correction of the code can be performed upon decoding to demultiplex the original information signals form the TDM signal on the reception side. In addition, if the error correction code is added to the dummy flag bits to form seven bits, the number of surplus bits becomes forty-one, so that the code rate is further raised.

On the other hand, it is sufficient to set the number of dummy flag bits to one for each channel, so that a larger number of surplus bits can be derived and the other information can be also transmitted using the surplus bits.

Moreover, by arranging the surplus bits after the dummy flag bits, there is also an effect such that an extra time is produced in the error correction decoding operation processing time on the reception side.

Third Embodiment

In the case of the system in which the dummy flag bits of one block to which the error correction code was added are transmitted as in the second embodiment, the dummy flag bits are detected on the reception side to check the appearance of the dummy signal. However, according to this system as well, if uncorrectable errors occur in the dummy flag bits during the transmission or the like, the malfunction occurs in the demultiplexer unit, so that there are problems such that the audio signal is dropped out and the rasping noise is generated.

The third embodiment intends to solve such problems and provide a time division multiplex (TDM) transmission system in which the code rate can be raised and even in the case where data errors occur in the transmitting system and modulating/demodulating system as well, the appearance of the dummy signal can be detected in the TDM signal demultiplexer unit with a high degree of reliability.

This embodiment will be summarized as follows. Information signals of N channels having different clock signal frequencies are arranged in the format of a time division multiplexed (TDM) signal by use of the reference clock signal of the frequency of which the maximum frequency or a frequency higher than the maximum frequency among the clock signal frequencies of these information signals was multiplied with N. The dummy signal coded due to a predetermined format is interposed into the portion where the information signal lacks and transmitted. On the reception side, a check is made to see if each of the composing TDM signals is the dummy signal or not by discriminating the foregoing format. In this way, the appearance of the dummy signal is detected.

Therefore, the dummy signal has a predetermined format and the dummy signal itself can be used to detect the dummy signal. Consequently, the error correcting capability is fairly high and the code rate can be also improved.

The dummy signal can be also detected by a majority logic circuit and an arrangement of the demultiplexer unit is not complicated.

Figure 11:
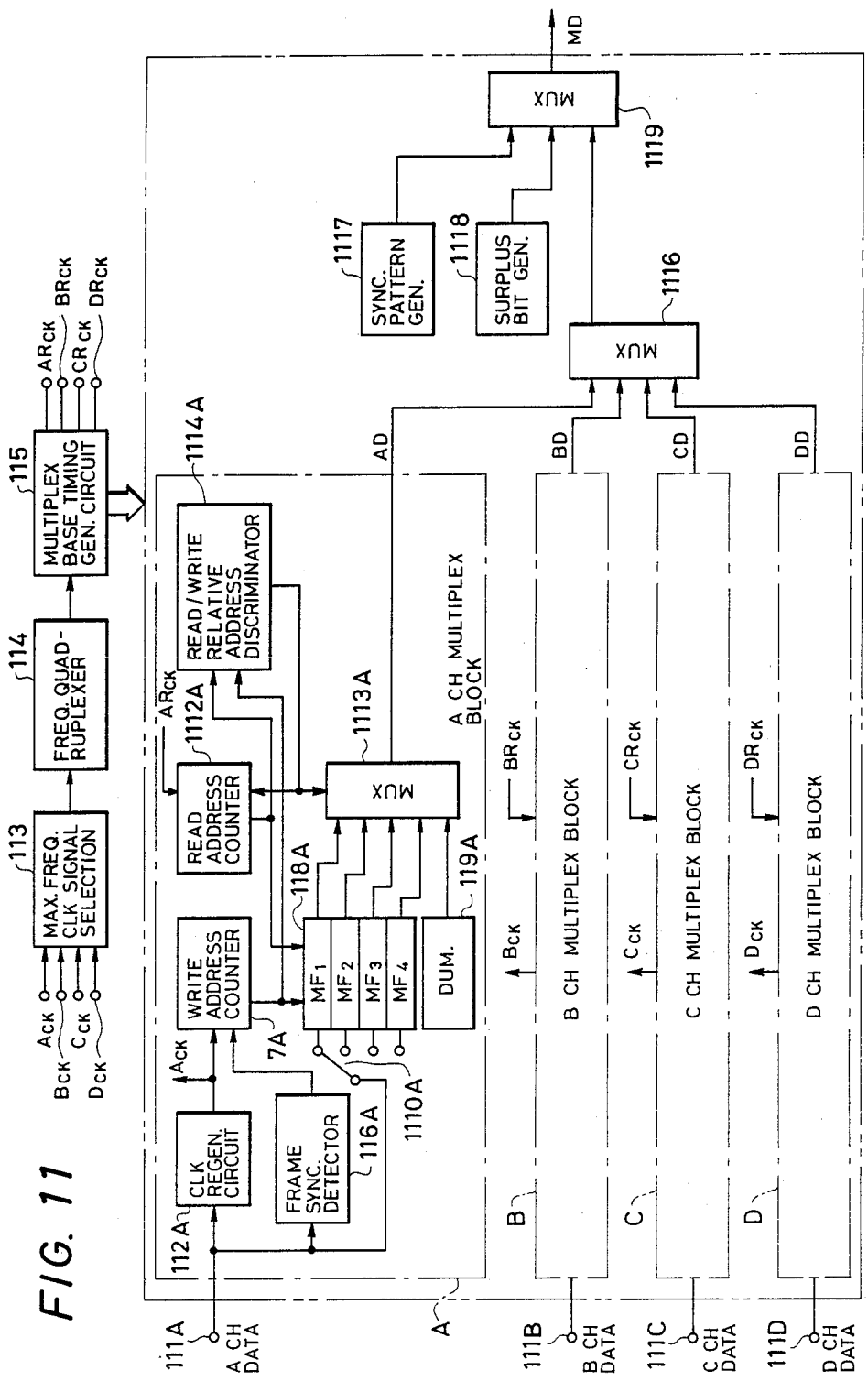
FIGS. 11 and 13 are block diagrams showing circuit arrangements of a multiplexer unit and a demultiplexer unit in a system of the third embodiment.
Figure 13:
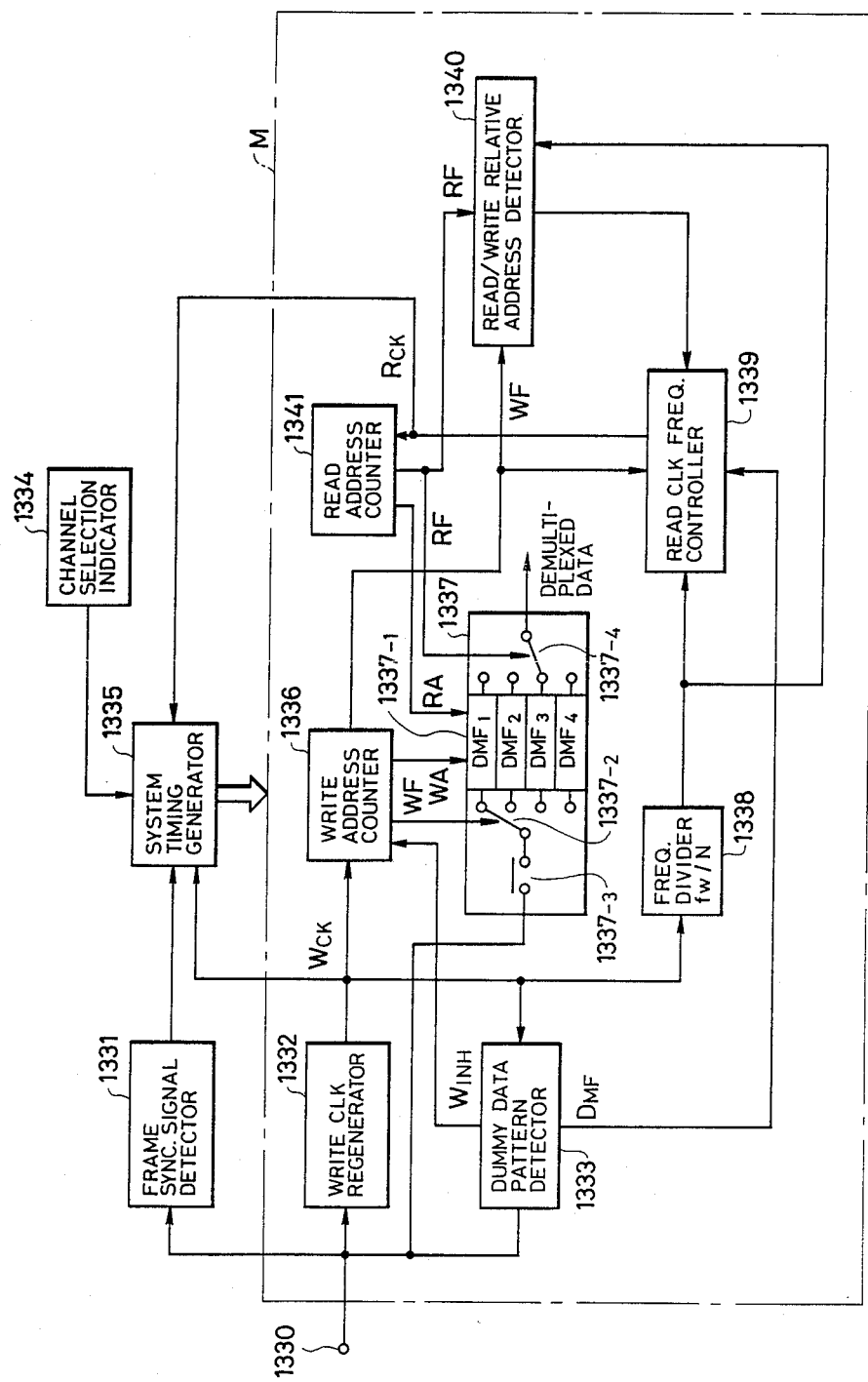

FIGS. 11 and 13 show the arrangement of the third embodiment and relate to an example in the case where the invention is applied to the time division multiplex of the PCM audio signal in the satellite broadcast.

FIG. 11 is a block diagram showing an arrangement of a time division multiplexer unit (encoder unit) and shows an example in the case of multiplexing the information signals of four channels of A to D.

A, B, C, and D denote multiplex blocks having the same constitution, respectively. Only the portion common to the A channel multiplex block A is shown in detail. The A channel multiplex block A will be described. The other channel multiplex blocks B, C, and D will be described as necessary.

The bit stream (hereinafter, also referred to as the data) having a constitution of 2048 bits/frame (including sixteen frame sync bits) of the PCM signal of the A channel supplied to an input terminal 111A is supplied to a clock regeneration circuit 112A to regenerate the clock signal $A_{CK}$ of the A channel. Similarly, the clock signals $B_{CK}$, $C_{CK}$, and $D_{CK}$ of the B, C, and D channels are regenerated from the data of the B, C, and D channels supplied to input terminals 111B, 111C, and 111D, respectively. The clock signals $A_{CK}$, $B_{CK}$, $C_{CK}$, and $D_{CK}$ regenerated are supplied to a maximum frequency clock signal selection circuit 113 to select the clock signal having the maximum frequency. The clock signal selected by the selection circuit 113 is supplied to a frequency quadruplexer 14 and quadruplexed and supplied to a multiplex base timing generation circuit 115. The generation circuit 115 generates the read clock signals $AR_{CK}$, $BR_{CK}$, $CR_{CK}$, and $DR_{CK}$ each having the frequency which is four times as high as the maximum clock frequency among the clock frequencies of the respective input channels. The generation circuit 115 also generates various kinds of timing signals necessary to multiplex (encode), for example, a switching signal of a changeover switch 1110A for switching the frame memories MF₁ to MF₄ in a memory block 118A, which will be explained hereinafter, a control signal of a write address counter 117A, a control signal of a read address counter 1112A, selection signals of multiplexers 1113A, 1116, and 1119, and the like.

The data of the A channel supplied to the input terminal 111A is supplied to a frame sync detection circuit 116A to detect the frame synchronization. The clock signal regenerated from the clock regeneration circuit 112A is counted by the write address counter 117A. The write address in the memory block 118A is designated by the count value of the address counter 117. The information data of the A channel is supplied through the switch 1110A to the memory block 118A constituting a frame buffer memory. In this embodiment, the memory block 118A is composed of four frame memories MF₁ to MF₄. Further, each frame memory consists of 2032 bits. For the interval when the frame sync signal exists, the counting operation of the write address counter 117A is stopped and at the same time, the switch 1110A is connected to the non-connection contact. The switch 1110A is sequentially switched for every 2032 bits of the information data in accordance with the order of the frame memories MF₁,—, MF₄, MF₁,—. Thus, the information data from which the frame sync signal was removed is stored in the frame memories MF₁,—, MF₄,—in the memory block 118A on a frame unit basis.

On the other hand, the read clock signal $AR_{CK}$ generated from the generation circuit 115 is counted by the read address counter 1112A. The read address in the memory block 118A is designated by the count value.

The read clock signals $AR_{CK}$, $BR_{CK}$, $CR_{CK}$, and $DR_{CK}$ are generated from the generation circuit 115 in accordance with this order in order to read out the data of 2032 bits in accordance with the order of the A, B, C, D,—channels. On the other hand, prior to outputting the read clock signal $AR_{CK}$, the readout operation from the memory block 118A is inhibited for the period of time corresponding to predetermined bits and at the same time, the counting operation of the read address counter 1112A is stopped. In this embodiment, the number of predetermined bits is set to sixty-four.

Therefore, the information data is read out of the memory block 118A (118B, 118C, 118D) in a manner such that after an expiration of the period of 64 bits, the data is read out of the frame memory $MF_h$ in the memory block 118A, frame memory $MF_k$ in the memory block 118B,—, frame memory $MF_p$ in the memory block 118D, and after an expiration of the period of time of 64 bits, the data is read out of the frame memory $MF_{(h+1)}$ in the memory block 118A,—, frame memory $MF_{(p+1)}$ in the memory block 118D,—. On the other hand, the read clock signal has the frequency which is at least four times as high as that of the write clock signal. The data is read out of the memory block 118A (118B, 118C, 118D) of the same channel for every four channels. Upon initialization, an offset is given between the write frame memory and the read frame memory. The readout operation is executed at an early period by the time corresponding to only the difference between the frequency of ¼ of the read clock signal frequency and the write clock signal frequency, so that the read address is advanced due to this difference.

On the other hand, the count values of the write address counter 117A and read address counter 1112A are compared by a read/write relative address discriminator 1114A. For example, when the data is read out of the frame memory MF₁ in the memory block 118A, if the writing operation into the frame memory MF₁ is not completed yet, namely, if the information data lacks, the discriminator 1114A stops the counting operation of the read address counter 1112A and stops the readout of the data of one frame. During this period of time, the dummy data consisting of the code string of a predetermined format is stored by the multiplexer 1113A and at the same time, the dummy data from a ROM 119A which has always been read out by the read clock signal $AR_{CK}$ is selected and outputted. Thus, the dummy data of one frame is interposed between the information data of the frame unit in the multiplexed data, so that the multiplexed data is continuous. The dummy data which is interposed in this case has the format consisting of a predetermined code string as mentioned before. The period when the dummy data is interposed is decided on the basis of the difference between the frequency of ¼ of the read clock frequency and the write clock frequency as mentioned before.

The data AD (BD, CD, DD) outputted from the multiplexer 1113A (1113B, 1113C, 1113D) as mentioned above is selectively outputted by the multiplexer 1116.

On the other hand, sixteen bits forming the sync pattern from a sync pattern generation circuit 1117, surplus bits, i.e., forty-eight bits from a surplus bit generation circuit 1118, and information data (2032 bits×4) of the A, B, C, and D channels from the multiplexer 1116 are selected as a block by the multiplexer 1119 in accordance with this order and outputted as the multiplexed data MD of one frame. Therefore, in this case, a structure of one frame is as shown in FIG. 12B.

FIG. 12A shows a structure of one frame before multiplex. FIG. 12C shows a structure of the multiplexed frame in the case where the dummy signal of the B channel appears. As will be obvious from FIGS. 12B and 12C, the number of surplus bits is forty-eight (in general, $(N-1)\times 16$ bits) and new information signals can be also transmitted by use of these surplus bits.

A demultiplexing apparatus to demultiplex the TDM signal into the original signals will now be described.

FIG. 13 is a block diagram showing an example of a demultiplexer unit to demultiplex the TDM signal into the original information signals on the reception side.

A TDM signal shown in FIG. 12B is inputted to an input terminal 1330.

This bit stream is supplied to a frame sync signal detection circuit 1331 and a write clock signal regeneration circuit 1332. The frame sync signal is detected by the detection circuit 1331. The write clock signal $W_{CK}$ is regenerated by the regeneration circuit 1332. The bit stream and write clock signal $W_{CK}$ are also supplied to a dummy data pattern detection circuit 1333 to detect the coincidence of the dummy data pattern due to the TDM data. The coincidence of the dummy data pattern is detected, for example, in the following manner by the detection circuit 1333. Assuming that the dummy data pattern (fixed pattern) consists of eight bits, when the dummy data capacity is 2032 bits, the dummy data pattern appears 254 times in one frame. Therefore, when the number of coincidence times of the dummy data pattern is, e.g., 200 or more, it is decided that the data is the dummy data. When the dummy data is determined by the detection circuit 1333, a holding signal $W_{INH}$ is generated from the detection circuit 1333 in order to stop the counting operation by a write address counter 1336, which will be explained hereinafter, by the period of time corresponding to one frame (2032 bits in this example), thereby substantially inhibiting the writing operation during this interval.

The frame sync signal, write clock signal $W_{CK}$, an output of a channel selection indication switch 1334 to select the reception channel, and read clock signal $R_{CK}$, which will be explained hereinafter, are supplied to a system timing generator 1335. The generator 1335 generates timing signals necessary for the decoding operation by the main unit M of the TDM signal demultiplexing apparatus (hereinafter, also referred to as a decoder).

On the other hand, this embodiment is provided with a memory block 1337 comprising: a frame buffer memory 1337-1 consisting of four frame memories ($DMF_1$ to $DMF_4$); frame memory change-over switches 1337-2 and 1337-4; and an input selection switch 1337-3 to supply the information signals of the channel selected by the switch 1334 to the frame memory change-over switch 1337-2 from the bit stream. The capacity of one-frame memory is set to a value enough to store the data transmission amount of one frame (2032 bits in this example)

The write clock signal $W_{CK}$ is supplied to the write address counter 1336 and the write address signal $W_A$ and the frame memory number signal $W_F$ corresponding to the write frame memory number are produced.

The signal $W_A$ is supplied to the memory block 1337 and designates the write address. The signal $W_F$ controls the switch 1337-2 to select the write frame. On the other hand, the holding signal $W_{INH}$ is also supplied to the write address counter 1336 to substantially stop the advance of the address signal, thereby inhibiting the substantial writing operation of the dummy data in the memory block 1337.

The write clock signal $W_{CK}$ is also supplied to a frequency divider 1338 and frequency divided so as to become the frequency ($=f_1$) of $1/N$ (N=4) of the transmission clock signal frequency after the time division multiplex. An output signal of the frequency divider 1338 is supplied to a read clock frequency controller 1339 to produce the read clock signal $R_{CK}$ of the frequency $f_0$. The controller 1339 receives a dummy data detection output $D_{MF}$ when the dummy data is detected by the dummy data pattern detection circuit 1333 and the output of the frequency divider 1338. The controller 1339 gradually reduces the read clock signal frequency $f_0$ from $f_1$ to $f_3$ from the time when the data is written into a special frame memory, e.g., the first frame memory $DMF_1$ in the memory block 1337 after the dummy data was detected. When the controller 1339 detects the difference of e.g., two frames between the write and read addresses in and from the first frame memory $MF_1$, the controller 1339 increases the read clock signal frequency $f_0$ from $f_3$ to $f_1$ by an output of a read/write relative address detection circuit 1340.

The read clock signal $R_{CK}$ is supplied to a read address counter 1341. The counter 1341 produces the read address signal $R_A$ and the frame memory number signal $R_F$ corresponding to the read frame memory number. The read address signal $R_A$ is supplied to the memory block 1337 and designates the read address. The frame memory number signal $R_F$ controls the switch 1337-4 to select the read frame memory.

The multiplexed transmission clock signal, i.e., the write clock signal $W_{CK}$ and the frame sync signal are detected from the bit stream supplied to the input terminal 1330 and shown in FIG. 12B or 12C and the frame synchronization is carried out.

When the power supply is turned on and when the selection channel is switched by the channel selection indication switch 1334, the change-over switches 1337-2 and 1337-4 are switched by the timing signals from the system timing generator 1335 in a manner such that the delay time corresponding to one frame is provided between the write frame memory and the read frame memory, namely, the offset corresponding to two frames is provided so that one frame exists between the write frame memory and the read frame memory. It is now assumed that the B channel is selected by the switch 1334 and the sampling frequency or clock signal frequency of the B channel is lower than that of the other channel before the multiplex on the transmission side.

After the frame synchronization was derived, the information signal of the B channel is taken out of the bit stream through the input selection switch 1337-3 by the timing signal from the generator 1335. Due to the switching of the switch 1337-2 by the frame memory number signal $W_F$, the information signals of one channel are sequentially supplied to the one-frame memories and sequentially written into the frame memories $DMF_1, DMF_2, —, DMF_4, DMF_1, —$ synchronously with the write clock signal $W_{CK}$.

On the other hand, the write clock signal $W_{CK}$ is divided into 1/N by the frequency divider 1338. The read clock signal $R_{CK}$ of the frequency $f_1$ ($=f_w/4$) is generated from the controller 1339. The frame change-over switch 1337-4 is switched synchronously with the read clock signal $R_{CK}$ with the delay time corresponding to two frames for the write frame memory due to the switching by the frame memory number signal $R_F$. The information signals of the B channel stored are sequentially read out of the frame memories $DMF_1$,—, $DMF_4$,—by the read clock signal $R_{CK}$ of the frequency of ¼ of that upon writing.

It is now assumed that the dummy data DU is interposed in, e.g., the 100th frame of the B channel. Therefore, when the data of the B channel in the 100th frame string is inputted, it is detected by the dummy data pattern detection circuit 1333 that the data is the dummy signal, so that the holding signal $W_{INH}$ is generated.

FIG. 14 shows a change in frequency of the read clock signal $R_{CK}$. In FIG. 14, DU diagrammatically shows the detection of the dummy data pattern and the times when the dummy data pattern was detected are indicated by $t_1$, $t_6$, and $t_{11}$. Due to the detection of the dummy data pattern, the holding signal $W_{INH}$ is generated to stop the counting operation of the write address counter 1336 for the period of time of one frame. The next information signals of the B channel after the dummy data are written into one frame memory in which a part of the dummy data has once been stored. The writing operation of the information signals (dummy data in this case) of the B channel of one frame is substantially stopped. Thus, the data consisting of only the information signals of the B channel from which the dummy data was removed is written into the frame buffer memory 1337-1. During this interval, the readout operation is carried out synchronously with the read clock signal $R_{CK}$ of the same frequency $f_1$. Consequently, the readout timing from the read frame memory is close to the writing timing into the write frame memory, and when the writing operation is restarted, the readout timing from the read frame memory is closest to the writing timing into the frame memory. In this state as well, the data is sequentially written into the respective frame memories $DMF_1$,—, $DMF_4$,—. During this period, when the data is first written into the first frame memory $DMF_1$ (at times $t_2$ and $t_7$) after the dummy data pattern was detected, these writing operations are detected by the read clock frequency controller 1339. Therefore, from times $t_2$ and $t_7$, the controller 1339 gradually decreases the frequency $f_0$ of the read clock signal $R_{CK}$ from $f_1$ to $f_3$ and maintains at the frequency $f_3$ for a predetermined period of time. In FIG. 14, the times when the frequency of the read clock signal $R_{CK}$ coincides with the frequency $f_3$ are indicated by $t_3$ and $t_8$.

On the other hand, for the period of time when the frequency $f_0$ of the read clock signal $R_{CK}$ is reduced from $f_1$ to $f_3$ and for the period of time when the frequency $f_0$ is held at the frequency $f_3$, the output frequency ($f_w/N$) of the frequency divider 1338 is counted for the period of time after the write frame memory became the first frame memory $DMF_1$ until the read frame memory becomes the first frame memory $DMF_1$. A check is made by the read/write relative address detection circuit 1340 to see if the count value becomes the value corresponding to two frames or not. The frequency of the read clock signal $R_{CK}$ is gradually returned from $f_3$ to $f_1$ from the time when the count value becomes the value corresponding to two frames (times $t_4$ and $t_9$) due to the result of the discrimination. From the times when the frequency $f_0$ of the signal $R_{CK}$ coincides with the frequency $f_1$ in this state (times $t_5$ and $t_{10}$), the frequency $f_0$ is maintained at the frequency $f_1$ and the apparatus waits until the next dummy data pattern is detected.

The reason why the read clock signal frequency $f_0$ is gradually decreased or increased is to avoid the sudden change in frequency and to reduce a deterioration in sound quality due to, particularly, a variation in sampling frequency and the like in the case where the PCM audio signal or the like in the satellite broadcast is demodulated into the analog audio signal. Therefore, it is desirable to fairly gradually change the read clock signal frequency for a long time as possible within the dummy data transmission period of time. For this purpose, it is sufficient to set the lower limit frequency $f_3$ of the read clock signal $R_{CK}$ to a small value.

In FIG. 14, the frequency $f_2$ denotes the frequency of the original transmission clock signal before the time division multiplex.

Since up to 2032 bits (2080 bits when the surplus bits are also used) can be used in discrimination of the dummy data as mentioned above, by use of a majority logic or the like for the dummy data pattern detection circuit 1333, the appearance of the dummy signal can be detected with an extremely high degree of reliability.

As described above, according to this embodiment, since the dummy signal was used as the code string of a predetermined format, the dummy signal itself can be used to detect the dummy signal. Therefore, the dummy flag bits indicating that the next signal is the dummy signal, and the like are unnecessary and the code rate can be raised. On the other hand, when data errors occur in the transmitting system and modulating-/demodulating system, the dummy signal can be detected due to a majority decision or the like with a very high degree of reliability. Th malfunction of the TDM signal decoder can be avoided.

What is claimed is:

1. A time division multiplex transmission system for time division multiplexing of a plurality of information signals each having information coded in a predetermined frame format and having either different sampling frequencies or clock signals frequencies, to form a resultant time division multiplexed signal having a predetermined frequency, and transmitting the resultant time division multiplexed signal by one transmission path, comprising the steps of:

rearranging said plurality of information signals so as to have a time division multiplexed signal format, by selecting a reference signal having a frequency corresponding to a frequency which is at least equal to a product of one of (a) the maximum frequency among said sampling frequencies, or (b) the maximum clock signal frequencies of said plurality of information signal, multiplied by the number of said plurality of information signals;

interposing a dummy signal, which has a length equal to one frame of the predetermined frame format, into a portion of the resultant time division multiplexed signal where the corresponding information signal is unavailable due to the difference in frequencies among the plurality of information signals;

whereby a continuous time division multiplexed signal is produced.

2. A time division multiplex transmission system for time division multiplexing of N channels of information signals, each having information coded in a predetermined frame format, and having different sampling frequencies or clock signal frequencies, to form a continuous resultant time division multiplexed signal, comprising:

a reference clock signal having a reference frequency determined by a product equal to N times a frequency which is selected as being at least equal to the maximum frequency among said sampling frequencies or clock signal frequencies, a multiplier unit having a frame buffer memory, a writing means for successively storing frame information from each channel in said frame buffer memory, and a means for interposing a dummy signal and dummy flag bits into a portion of said resultant time division multiplexed signal during assembly thereof where an information signal is unavailable due to the differences in frequency among said N channels, thereby forming the continuous resultant time division multiplexed signal, a reading means for performing a data reading operation from said frame buffer memory; said reading means, when approaching reading of a portion of said frame buffer memory which is undergoing a writing operation by said writing means, stopping until the data reading operation reaches predetermined frames, said data reading operation being continuously stopped for a period of time corresponding to Y frames (Y being an integer larger than 1) and at the same time, a dummy signal of one frame being continuously transmitted Y times.

3. A time division multiplex transmission system for time division multiplexing information signals of N channels (N being an integer equal to or larger than 2) having different sampling frequencies or clock signal frequencies and transmitting said time division multiplex signal by one transmission line, comprising:

a reference clock signal, said information signals of N channels being time division multiplexed by use of said reference clock signal, said reference clock signals having a frequency which is at least as large as a product equal to N times a maximum frequency of either said sampling frequencies or of said clock signal frequencies of said information signals of N channels, and means for interposing a dummy signal in a portion of said multiplexed signal during assembly thereof where an information signal is unavailable due to the differing frequencies among said N channels, thereby forming a continuous time division multiplexed signal, wherein said means for interposing a dummy signal inserts dummy flag bits of N channels (AF, BF, CF and DF in FIG. 8) combined as one block and error correction code (PARITY in FIG. 8) added to said dummy flag bits of said the block, each dummy flag bit being to discriminate whether a frame of the time division multiplexed signal is an information signal or a dummy signal.

4. A transmission system according to claim 3, wherein surplus bits are arranged between the dummy flag bits of said one block to which the error correction codes were added and the information signals of N channels.

5. A time division multiplex transmission system for time division multiplexing a plurality of information signals having different sampling frequencies or clock signal frequencies and transmitting said time division multiplexed signal by one transmission path, wherein said plurality of information signals is time division multiplexed by use of a reference clock signal, said reference clock signal having a frequency equal to at least the product of the number of said plurality of information signals time either (a) a reference sampling signal or (b) another reference clock signal having the frequency equal to a maximum frequency among (a) said sampling frequencies or (b) said clock signal frequencies of said plurality of information signals, a dummy signal, which has a length equal to one frame of the predetermined frame format, including a code string of a predetermined format, and a means for interposing said dummy signal in a portion where an information signal is unavailable due to differences among the frequencies of the information signals and said frame format being analyzed by a discriminating means on a reception means to detect whether each of said time division multiplexed component signals is a dummy signal, thereby detecting appearance of said dummy signal.

6. A time division multiplex transmission system for time division multiplexing of a plurality of information signals having information coded in a predetermined frame format and having either different sampling frequencies or clock signal frequencies, to form a resultant time division multiplexed signal having a predetermined frequency, and transmitting the resultant time division multiplexed signal by one transmission path, comprising the steps of:

rearranging said plurality of information signals so as to have a time division multiplexed signal format, by selecting a reference signal having a frequency corresponding to a frequency which is at least equal to a product of one of (a) the maximum frequency among said sampling frequencies, or (b) the maximum clock signal frequencies of said plurality of information signals, multiplied by the number of said plurality of information signals;

interposing a dummy signal into a portion of the resultant time division multiplexed signal where the corresponding information signal is unavailable due to the difference in frequencies among the plurality of information signals;

wherein portions of said plurality of information signals are stored into memory means each comprising at least three frame memories, said plurality of information signals being stored on a frame unit basis in a real time manner using a selected one of (a) sample signals and (b) clock signals of said respective information signals, said portions of said stored information signals being read out of said memory means at a timing corresponding to the timing of said selected one of said reference sample signal and said reference clock signal, in accordance with a predetermined order such that said portions of said plurality of information signals form the time division multiplexed signal; and where the timing to read out said portions of said stored signals from said memory means occurs during the reading operation before the storage of a portion of a corresponding one of said plurality of information signals into the memory means, the reading operation from the memory means is not performed and instead a dummy signal having a length equal to one frame of the predetermined frame format is substituted for the unavailable corresponding information signal, whereby a continuous time division multiplexed signal is provided.

7. A time division multiplex transmission system including a decoder for demultiplexing a received N-channel time division multiplexed signal which contains a dummy signal having a length equal to one frame of a predetermined frame format being substituted for unavailable corresponding information signal, memory means 35-37, 39-41) comprises at least three frame memories, each provided to each channel, for storing the received multiplexed signal in a real time manner using a timing of a write clock signal;

means (43) for sequentially reading the stored signal from said memory means (35-37, 39--41) using a timing of a read clock signal the frequency of which is 1/N time the frequency of the write clock signal to output the demultiplexed signal for each channel;

means (31) for detecting said dummy signal in the received multiplexed signal, and upon said dummy signal detection for inhibiting said dummy signal from being stored into said memory means (35-37, 39-41) and also reducing the frequency of the read clock signal; and temporary register means (38, 42) for storing the received multiplexed signal in a real time manner where the reading operation from one frame memory of said memory means (35-37, 39-41) has not been completed before the timing of storing into said one frame memory the received multiplexed signal in a real time manner commences due to the reduced frequency of the read clock signal;

wherein the reduced frequency of the read clock signal is recovered at the timing when said temporary register means (38, 42) stores the received multiplexed signal.

* * * * *